(12) United States Patent
Blewett et al.

(10) Patent No.: US 8,606,968 B2
(45) Date of Patent: Dec. 10, 2013

(54) APPARATUS AND A METHOD FOR PREDICTING COMMANDS

(75) Inventors: Jonathan Ross Blewett, Cambridge (GB); Adam Reid, Hampshire (GB)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 12/644,580

(22) Filed: Dec. 22, 2009

(65) Prior Publication Data
US 2010/0161833 A1 Jun. 24, 2010

(30) Foreign Application Priority Data

Dec. 22, 2008 (GB) .................................. 0823354.6

(51) Int. Cl.
*G06F 3/00* (2006.01)
(52) U.S. Cl.
USPC .......................................................... 710/5
(58) Field of Classification Search
USPC .......................................................... 710/5
See application file for complete search history.

(56) References Cited

U.S. PATENT DOCUMENTS

2008/0114773 A1* 5/2008 Choi et al. ...................... 707/10
2010/0114857 A1* 5/2010 Edwards et al. .............. 707/709

OTHER PUBLICATIONS

"AnandTech Forums"; http://forums.anandtech.com/showthread.php?t=137064; Jan. 27, 2008; pp. 1-2.*

* cited by examiner

*Primary Examiner* — Chun-Kuan Lee
(74) *Attorney, Agent, or Firm* — Alston & Bird LLP (57) ABSTRACT

An apparatus comprising at least one processor and at least one memory including computer program code. The at least one memory and the computer program code configured to, with the at least one processor, cause the apparatus at least to detect a first user input corresponding to a first command, begin a first process corresponding to a second command in response to said first user input, detect a second user input corresponding to the second command and complete said first process in response to said second user input.

26 Claims, 8 Drawing Sheets

APPARATUS AND A METHOD FOR PREDICTING COMMANDS

CROSS REFERENCE TO RELATED APPLICATION

The present application claims priority to Great Britain Patent Application No. 0823354.6 filed Dec. 22, 2008, the contents of which are incorporated by reference herein.

BACKGROUND TO THE INVENTION

Examples of this invention relate to the selection of commands on an apparatus by a user.

Computing devices include input mechanisms which allow users to issue various commands to the device. Such mechanisms may include keypads, computer mice and touch-screen displays, amongst many others. Commands may include instructions to open applications, select menu options, position a cursor, select text, etc. When a user issues a command to open an application, an operating system within the device begins loading that application into memory. Once loaded, the user can use that application.

SUMMARY OF EXAMPLES OF THE INVENTION

In an example embodiment, the present invention provides an apparatus comprising: at least one processor; and at least one memory including computer program code, the at least one memory and the computer program code configured to, with the at least one processor, cause the apparatus at least to: detect a first user input corresponding to a first command; begin a first process corresponding to a second command in response to said first user input; detect a second user input corresponding to the second command; and complete said first process in response to said second user input.

In an example, the first command is to select a first application. In an example, the second command is to launch the first application.

In an example, the first process is launching the first application. In an example, the launch is completed if the second user input is detected within a predetermined time from said first user input.

In an example, completing the launch comprises loading said first application into memory and displaying the application on a display.

In an example, the at least one memory and the computer program code further configured to, with the at least one processor, cause the apparatus at least to: stop launching the first application if said second user input is not detected.

In an example, the at least one memory and the computer program code further configured to, with the at least one processor, cause the apparatus at least to: load said application into memory but not display the application if said second user input is not detected.

In an example, the user inputs are made through an input device.

In an example embodiment, the present invention provides a mobile telephone comprising the apparatus described above.

In an example embodiment, the present invention provides a method comprising: detecting a first user input corresponding to a first command; beginning a first process corresponding to a second command in response to said first user input; detecting a second user input corresponding to the second command; and completing said first process in response to said second user input.

In an example, the first command is to select a first application. In an example, the second command is to launch the first application.

In an example, the first process is launching the first application. In an example, the launch is completed if the second user input is detected within a predetermined time from said first user input.

In an example, completing the launch comprises loading said first application into memory and displaying the application on a display.

In an example, the method comprises: stopping launching the first application if said second user input is not detected.

In an example, the method further comprises: loading said application into memory but not displaying the application if said second user input is not detected.

In an example, the user inputs are made through an input device.

In an example embodiment, the present invention provides a computer program product comprising a computer-readable medium bearing computer program code embodied therein for use with a computer, the computer program code comprising: code for detecting a first user input corresponding to a first command; code for beginning a first process corresponding to a second command in response to said first user input; code for detecting a second user input corresponding to the second command; and code for completing said first process in response to said second user input.

This summary provides examples of the invention which are not intended to be limiting on the scope of the invention. The features of the invention described above and recited in the claims may be combined in any suitable manner. The combinations described above and recited in the claims are not intended to limit the scope of the invention.

Features and advantages associated with examples of the invention will be apparent from the following description of some examples of the invention.

BRIEF DESCRIPTION OF THE DRAWINGS

Examples of the invention will now be described in more detail, with reference to the accompanying drawings in which.

DETAILED DESCRIPTION OF EXAMPLE EMBODIMENTS

An example embodiment is based on the concept that a first action by a user may indicate that a second action is about to take place. This example is also based on the concept that a computing device can prepare for the second action in response to detecting the first action. In this example, the time taken for the corresponding command to be carried out by the computing device, after the second action is performed by the user, may be reduced. This example of the invention can be applied in any situation where a first user action causes a computing device to perform one activity in relation to a particular command, and a subsequent user action causes the computing device to perform a different activity in relation to that command. Alternatively it may be applied where a computing activity would normally only be performed in response to the second user action and not the first. According to the described example, preparations are made within the computing device for the activity associated with the second user action to take place as soon as the first user action is recognised.

A first example embodiment is where a single click of a button causes an icon to be selected, or highlighted, and a double click of the button causes the device to activate a particular command associated with the icon. In this example, it is expected that time savings of approximately 0.1 to 0.5 seconds, depending on the time taken by a user to complete a double click action, could be achieved by responding to the first click by loading code or data associated with the command expected to be activated. In this example, the code is present in RAM earlier than if the preparatory loading had not taken place. In this example, in the event that the anticipated user action does not occur, the code or data can be unloaded from RAM (or overwritten) as necessary. In this example, the time saving is based on the time taken for a user to press a button a second time during a double-click action. The time saving may be less than or greater than 0.5 seconds, depending on the speed of the double-click action.

A further example embodiment is for launching a messaging application on a touch screen device. In this example, a first tap by the user selects the messaging icon. In this example, the device predicts that, as the user has selected the icon, his/her intention will probably be to launch the messaging application. In this example, the device gets the messaging application prepared in the background so that if the user does continue with a second tap on the messaging icon, the messaging application could be launched approximately 0.5 seconds quicker than if the device had not done anything other than select the icon until the second tap. In this example, if the second tap does not follow after the first, then the messaging application may simply be left ready behind the scenes. Alternatively, if another first tap is initiated, on a different icon, the application can be discarded from memory.

Figure 1:
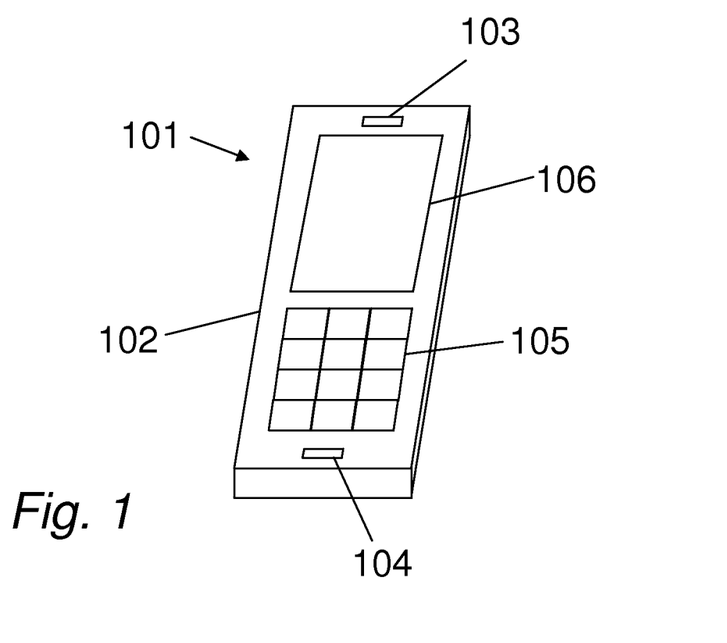
FIG. 1 is a mobile device in accordance with an example of the invention.

More detailed example embodiments will now be described with reference to the drawings. A mobile device 101 as shown in FIG. 1 is an example of a device in which an embodiment of the invention may be implemented. In this example, the mobile device 101 comprises an outer casing 102, which includes an earphone 103 and a microphone 104. In this example, the mobile device 101 also includes a keypad 105 and a display 106. In this example, the keypad 105 enables a user to enter information into the mobile device 101 and instruct the mobile device to perform the various functions which it provides. For example, a user may enter a telephone number, or select another mobile device from a list stored on the mobile device 101, as well as perform functions such as initiating a telephone call. In this example the display 106 may also be a touch-screen and act as an input device for the mobile device 101.

Figure 2:
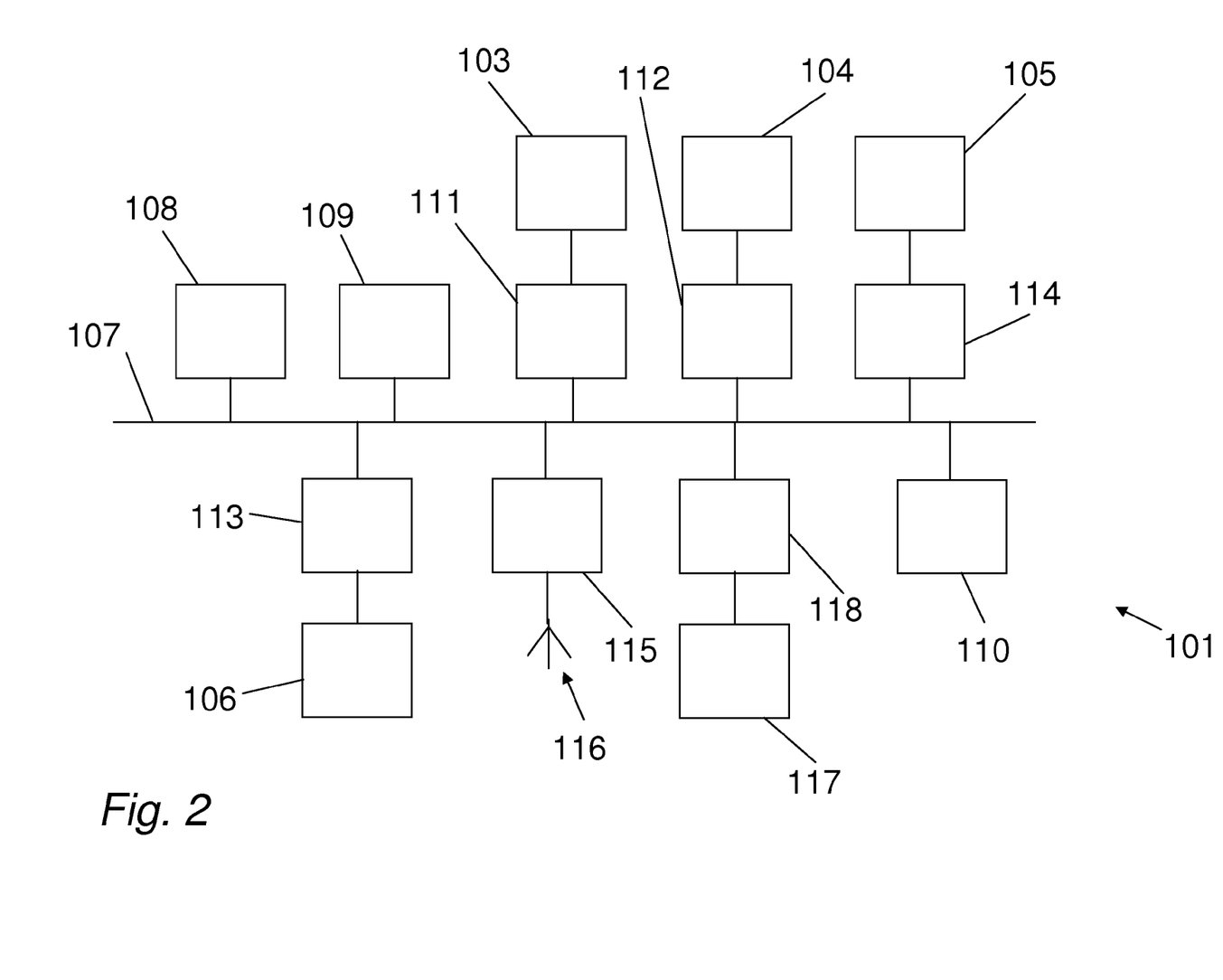
FIG. 2 is an example of the components of the device of FIG. 1.

FIG. 2 is a schematic diagram showing the components of the mobile device 101, in an example embodiment. In this example, the components of the mobile device 101 include the earphone 103, the microphone 104, the keypad 105 and the display 106. In this example, the mobile device 101 also includes a system bus 107 to which the components are connected and which allows the components to communicate with each other. In this example, the components are shown to communicate via a single system bus 107. However, the mobile device may include several buses to connect the various components. In this example, the device also includes an application processor 108, a baseband processor 109, memory 110, an earphone controller 111, a microphone controller 112, a display controller 113, and a keypad controller 114. In this example, the application processor 108 is for running an operating system and user applications. In this example, the baseband processor 109 is for controlling a telephony stack. In this example, the device 101 also includes a mobile telephone radio 115. In this example, the mobile telephone radio 115 is also connected to an antenna 116. In this example, the mobile device 101 is arranged to communicate, via radio 115, with a base station of a mobile phone network. In this example, the device 101 also includes a storage device 117 and a storage device controller 118. In this example, the storage device 117 is connected to the storage device controller 118. The storage device 117 may be an internal hard drive or a removable storage device such as a flash memory card.

This description of the components of a mobile device is one example of the manner in which the components may be arranged. In other example, variations are possible which include different components and different arrangements of those components. The invention is not limited to any particular set of components nor to any particular combination of those components. Advances in computing device technology may result in certain components being replaced by others which perform the same function. In a further example, such a device could also embody the invention.

In an example embodiment, the mobile device 101 includes an operating system (OS) 201 which is stored in a Read Only Memory (ROM) portion of memory 110. In an example, the device 101 also includes other software applications which may be stored in ROM or which may be stored in the storage device 117. In this example, the application processor 108 is arranged to execute instructions of the OS and of the applications. In this example, execution of these instructions can cause mobile device 101 to carry out particular functions by controlling the various hardware components of the device.

Figure 3:
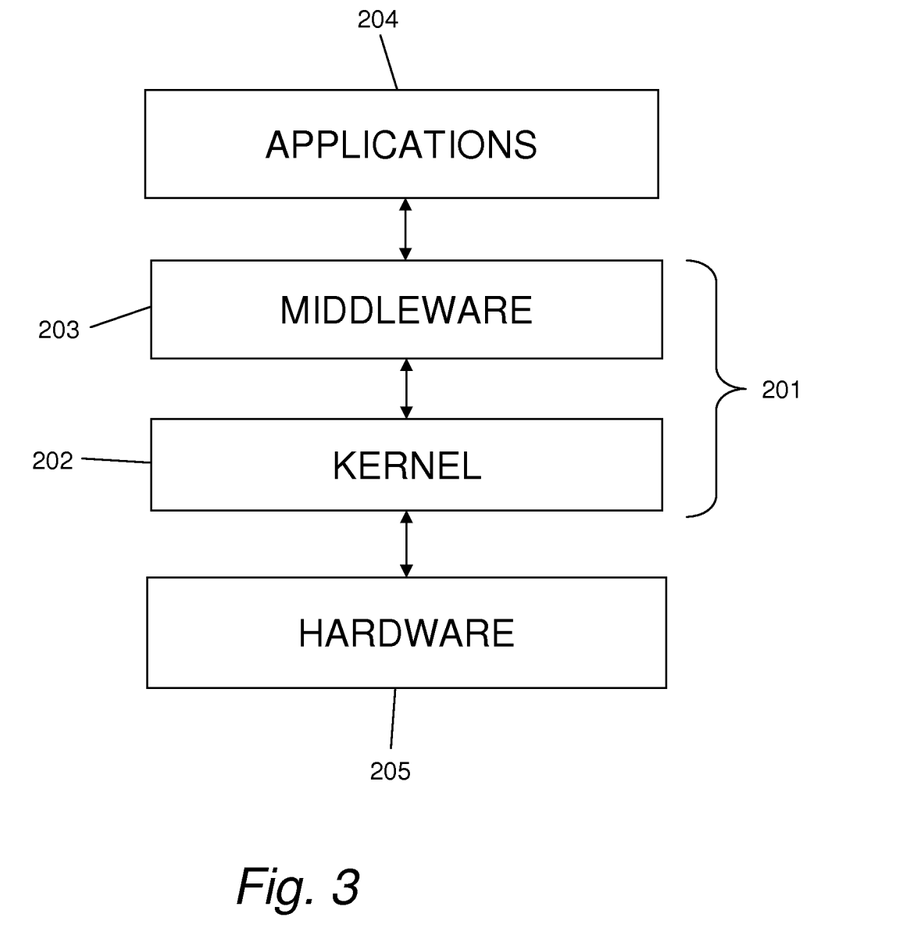
FIG. 3 is an example of the software components of the device of FIG. 1.

FIG. 3 is a functional diagram showing the logical links between software and hardware components of the device 101, in an example embodiment. In this example, the operating system 201 includes a kernel 202 and a middleware section 203. In this example, the kernel 202 is arranged to manage the mobile device's 101 hardware and communications between hardware and software stored on the device. In this example, the middleware 203 controls communication between applications running on the device and the system resources. In this example, the mobile device 101 has a number of applications 204 stored in memory 110 or storage device 117. In this example, these applications may be part of the operating system 201 or may be third-party applications. In this example, each of the applications may access computing resources through the middleware section 203. In this example, the kernel 202 controls access to the hardware 205.

Figure 4:
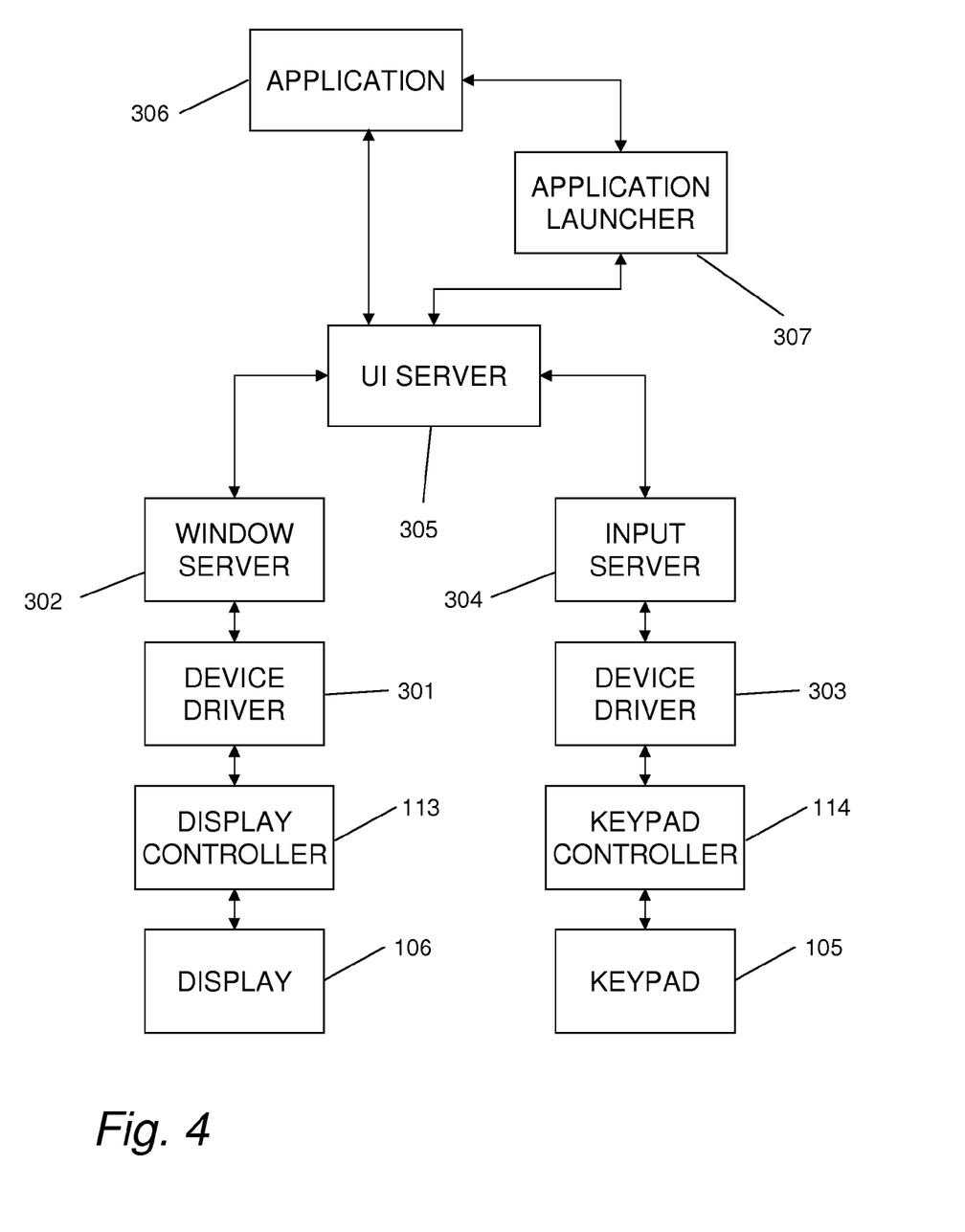
FIG. 4 is a further example of the software components of the device of FIG. 1.

FIG. 4 is a further functional diagram showing the logical links between software and hardware components of the device 101, in an example embodiment. In this example, the device 101 includes the display 106 and the display controller 113 discussed above. In this example, the device also includes a display device driver 301 which is a software interface which provides the OS 201 and other applications with access to the display 106. In this example, the OS 201 includes a window server 302 which controls access by the OS and other applications to the display 106. In this example, the window server 302 controls and co-ordinates access to the display.

In this example, the device 101 includes the keypad 105 and the keypad controller 114 discussed in relation to FIGS. 1 and 2. In this example, the device also includes a keypad device driver 303 which is a software interface which provides the OS 201 and other applications which are controlled by the keypad 105. In this example, the OS 201 includes an input server 304 which controls access by the keypad 105 to the OS and other applications.

In this example, the device also includes a user interface (UI) server 305. In this example, the UI server 305 is arranged to receive input signals from input server 304. In this example, the UI server 305 is arranged to interpret signals from the input server 304 and pass them on to applications. In this example, the UI server 305 is arranged to pass input signals on to application 306. In this example, the UI server 305 is also arranged to interpret signals from the application 306 and pass these on to the windows server 302.

In this example embodiment, the device also includes an application launcher 307. In this example, the application launcher 307 receives signals from the UI server 305 which instructs it to launch applications, for example, in response to an input from the keypad 105.

Figure 5:
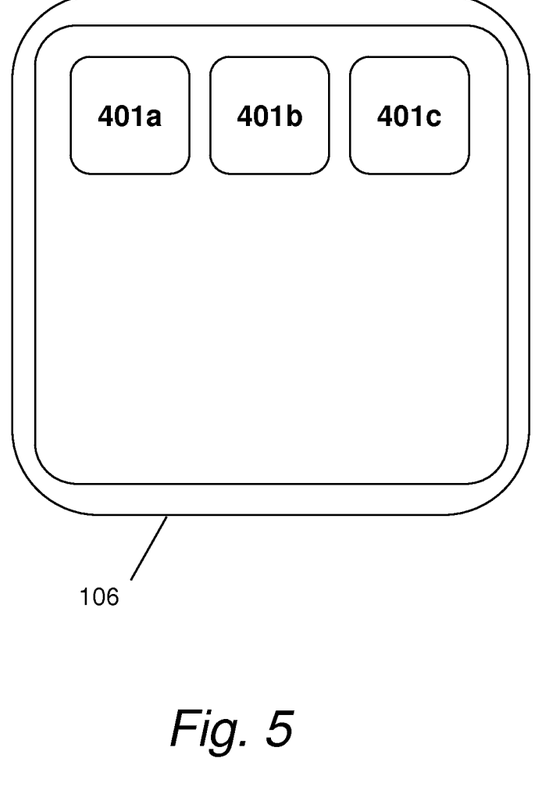
FIG. 5 is an example of icons shown on the display of the device of FIG. 1.

A method of operation of the device 101 in accordance with an example embodiment will now be described. In this example, the device 101 is configured to predict certain user commands on the basis of certain other user commands. In particular, in this example, the device 101 is arranged to predict a command to launch an application. In this example, the device 101 is displaying, on display 106, icons 401a, 401b and 401c, each of which represent an application stored on the device 101. This is shown in FIG. 5. In this case, icon 401a represents application 306.

In this example, as noted above, a user of the device 101 may use the touch screen display 106 as an input device. In this example, if the user wishes to launch application 306, he should "double-click" the icon 401a. In other words, the user should press the display 106 twice, where the icon 401a is displayed. In this example, the second press should be within a predetermined time of the first press. In this example, a single press of the display 106, or a double-click in which the second press comes more than the predetermined time after the first press, results in the icon 401a being highlighted on the display 106, but the application 306 not being launched.

Figure 6:
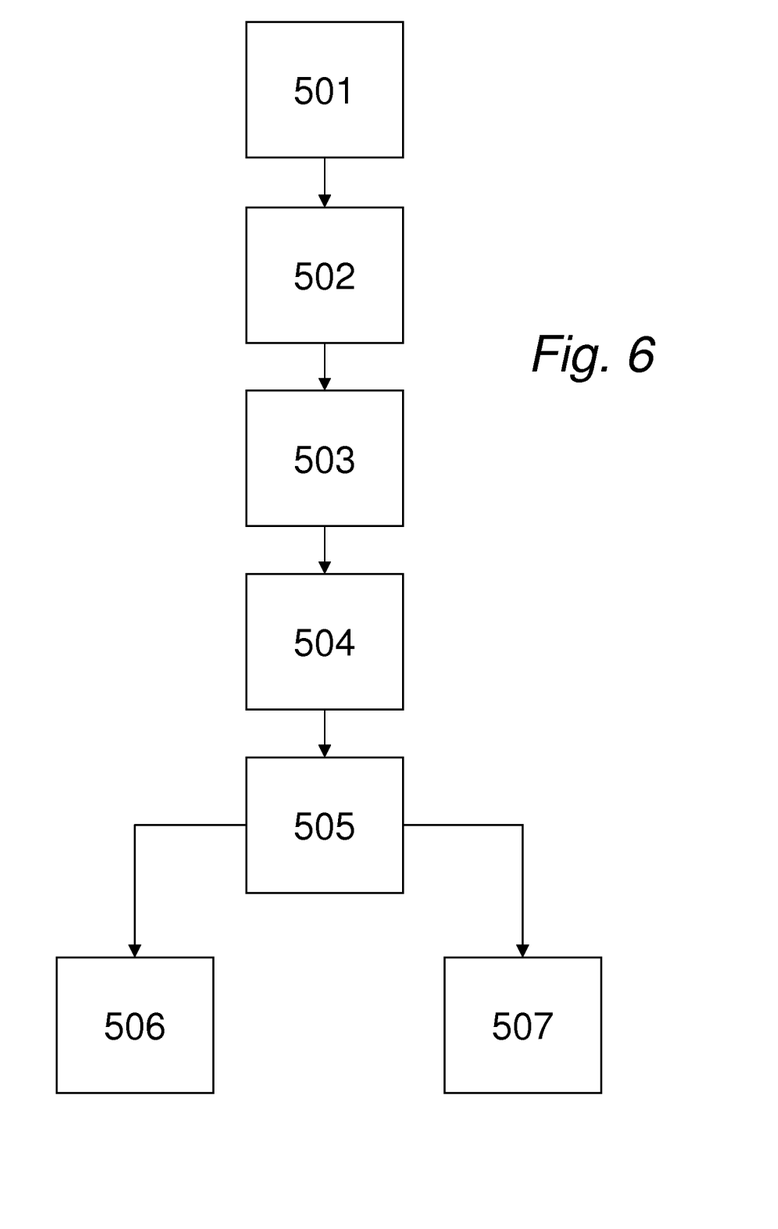
FIG. 6 is an example of the method of operation of the device shown in FIG. 1.

FIG. 6 is a flow chart showing the method of operation of the device 101 in this example. In this example, the user presses the display 106 where icon 401a is displayed (block 501). In this example, the UI server 305 is configured to do two things. In this example, the UI server 305 instructs the window server 302 to highlight the icon 401a on the display 106 (block 502). In this example, the UI server 305 instructs the application launcher 307 to begin launching the application 306 (block 503). In this example, the UI server 305 also starts a timer (block 504). In this example, the timer may be 0.1 seconds. The UI server 305 then waits for another press of the display 106 (block 505). In this example, if a second press is not detected before the timer expires, the UI server 305 instructs the application launcher 307 to abort launch of the application 306 (block 506). In this example, if a second press is detected before the timer expires, the UI server 305 does not instruct the application launcher 307 to abort launch, and the application launches as normal (block 507).

In this example, the application 306 could be launched as much as 0.1 seconds before the user presses the display 106 a second time.

In this example, if the application launcher 307 receives an instruction to abort, it stops launching the application. This means completely stopping the launching process, and removing the application 306 from memory or marking it for deletion from memory. In an alternative example, the application launcher 307 can be configured to continue launching the application 306 in the background. In this example, the user will not be aware of this, and the application 306 will not be displayed. However, in this example, if the user wishes to load the application 306 as some later point, as it is preloaded in memory the loading process may be substantially quicker.

A further method of operation of the device 101 in accordance with an example embodiment will now be described. In this example, the device 101 is arranged to predict a command to select a menu option. In this example, the device 101 includes various menu systems, both within the operating system UI, and within individual applications. In this example, the device 101 is displaying, on display 106, a menu list 601 for application 306. In this example, the list includes four drop-down menus: MENU 1 601a, MENU 2 601b, MENU 3 601c and MENU 4 601d. In this example, the user has selected MENU 1 601a. MENU 1 includes four options: OPTION 1, OPTION 2, OPTION 3 and OPTION 4 This is all shown in FIG. 7.

Figure 7:
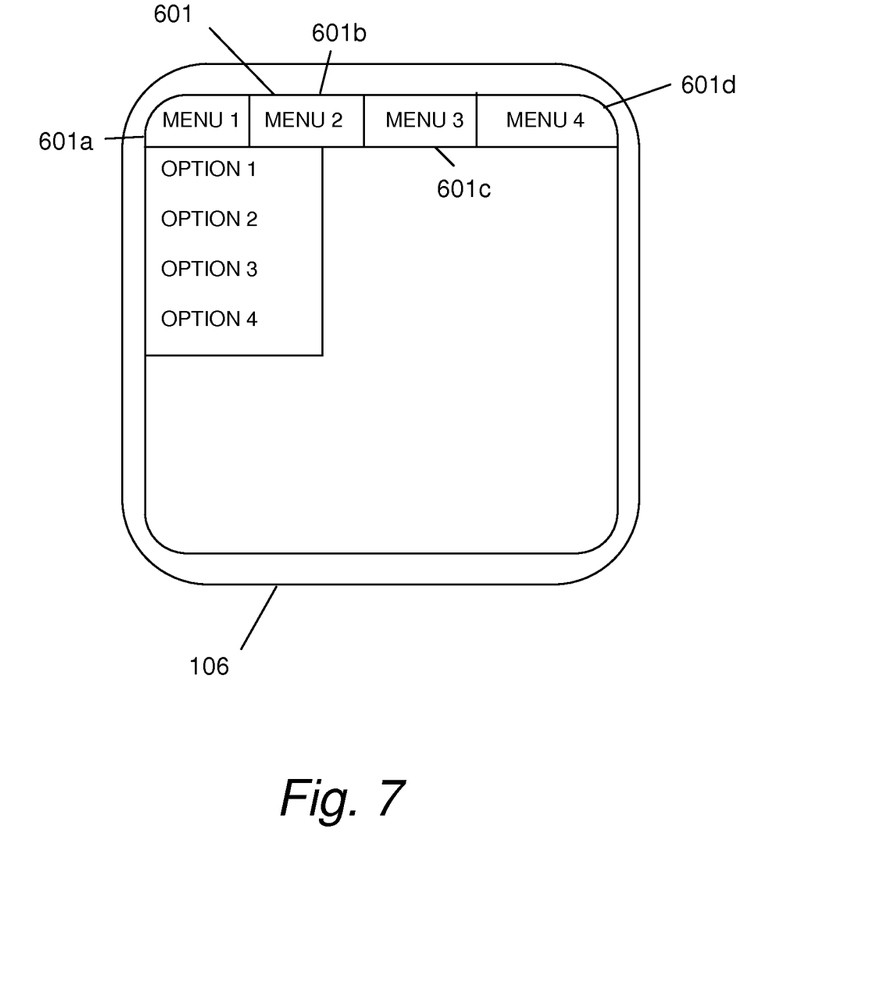
FIG. 7 is an example of menu options shown on the display of the device of FIG. 1.

In this example, as noted above, a user of the device 101 may use the touch screen display 106 as an input device. In this example, if the user wishes to select a menu option, he should "click" on one of the options. Before doing this, he should first select the option so that it is highlighted on the display 106. In this example, once the option is highlighted, the user presses the touch-screen in order to open the menu item. There is no particular time limit for doing this.

Figure 8:
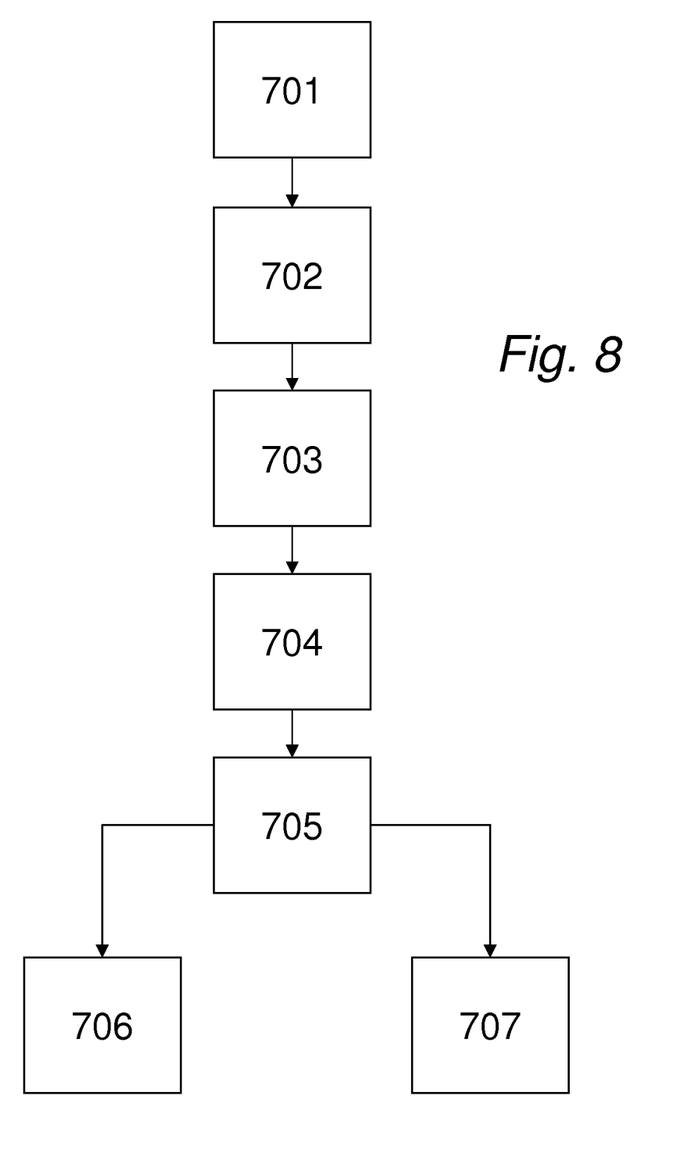
FIG. 8 is a further example of the method of operation of the device shown in FIG. 1.

FIG. 8 is a flow chart showing the method of operation of the device 101 in this example. In this example, the user presses the display 106 where OPTION 1 is displayed (block 701). OPTION 1, in this example, is a printing option. In this example, the UI server 305 instructs the window server 302 to highlight OPTION 1 on the display 106 (block 702). In this example, the UI server 305 instructs the application 306 to begin launching a print application (block 703). In this example, the UI server 305 optionally also starts a timer (block 704). In this example, the timer may be 0.5 seconds. In this example, the UI server 305 then waits for another press of the display 106 (block 705). In this example, if a second press is not detected before the timer expires, the UI server 305 instructs the application 306 to abort launch of the print application (block 706). In this example, if a second press is detected before the timer expires, the UI server 305 does not instruct the application launcher 307 to abort launch, and the print application launches as normal (block 707).

In this example, the print application is launched as much as 0.5 seconds before the user presses the display 106 a second time.

In this example, if the application 306 receives an instruction to abort, it stops preparing for the print operation. This may mean completely stopping a launching process, and removing any code associated with the print operation from memory, or marking it for deletion from memory. In an alternative example, the application launcher 307 can be configured to continue launching the print operation in the background. In this example, the user will not be aware of this, since the print operation will not be displayed. However, in this example, if the user wishes to perform the print operation as some later point, as associated code is preloaded in memory the loading process may be substantially quicker.

In a further example embodiment, the device 101 includes a mouse, track pad, or other cursor based input mechanism. In this example, menu options are highlighted automatically when a user hovers the cursor over the menu option. In this example, the application begins loading or preparing to perform the menu option which is highlighted as soon as it is highlighted. In this example, the UI server 305 then waits for a user to select the menu option before full loading the option to which it relates.

The above embodiment has been described with reference to a mobile device, for example a mobile telephone, which includes a keypad and a touch-screen display. It will be appreciated that the present invention is not limited to such devices. The present invention may be used with other computing devices, including desktops computers, personal digital assistants, smartphones, set-top boxes, etc. Example embodiments also include other input devices including computer mice, writing tablets etc.

The above embodiment has been described with reference to loading an application from an icon on a display screen. The invention is not limited to this use. For example, any situation in which a command to initiate a process is preceded by another command, which may be used as an indication of initiation command, may benefit from examples of the invention.

Instead of the example of a double-tap user action as discussed in the context of the described embodiments, the user input could be another type of input that is not a single quick tap. In one example it could be a long press of a button. In another example it could be a swipe gesture. In this example an operation associated with the swipe gesture could be triggered when a user first contacts a touch screen with an item such as a finger or a stylus. If the user then continues to perform a predefined swipe gesture, for example by moving the item across the screen in a particular location, pattern or direction, then the operation could complete. On the other hand, if the user lifts the item from the touch screen without completing a predefined swipe gesture, the operation could be aborted. This need not affect the user's experience of using the device, since the processing to prepare for the operation could be performed in the background incurring little or no delay to the other current operations of the device.

In at least one example embodiment, computing devices may be made to appear to a user to be more responsive. In an example in which the invention is implemented in software, without changes to hardware, this example embodiment may be implemented at low cost.

In an example embodiment, the present invention provides an apparatus comprising: means for detecting a first user input corresponding to a first command; means for beginning a first process corresponding to a second command in response to said first user input; means for detecting a second user input corresponding to the second command; and means for completing said first process in response to said second user input.

Examples of the present invention may be implemented in software, hardware, application logic or a combination of software, hardware and application logic. The software, application logic and/or hardware may reside on an individual component, computer chip or other computing apparatus. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Various modifications, changes, and/or alterations may be made to the above described embodiments to provide further embodiments which use the underlying inventive concept, falling within the spirit and/or scope of the invention. Any such further embodiments are intended to be encompassed by the appended claims.

The invention claimed is:

1. An apparatus comprising:
at least one processor; and
at least one memory including computer program code, the at least one memory and the computer program code configured to, with the at least one processor, cause the apparatus at least to:
detect a first user input corresponding to a first command;
begin a first process corresponding to a second command in response to said first user input;
detect a second user input corresponding to the second command; and
complete said first process in response to said second user input,
wherein a combination of the first and second user inputs is at least one of a double click, a double tap, a long press or a swipe gesture.

2. An apparatus according to claim 1, wherein the first command is to select a first application.

3. An apparatus according to claim 2, wherein the second command is to launch the first application.

4. An apparatus according to claims 3, wherein said first process comprises launching the first application.

5. An apparatus according to claim 4, wherein the launch is completed if the second user input is detected within a predetermined time from said first user input.

6. An apparatus according to claims 5, wherein completing the launch comprises loading said first application into memory and displaying the application on a display.

7. An apparatus according to any of claims 6, the at least one memory and the computer program code further configured to, with the at least one processor, cause the apparatus at least to:
stop launching the first application if said second user input is not detected.

8. An apparatus according to any of claims 6, the at least one memory and the computer program code further configured to, with the at least one processor, cause the apparatus at least to:
load said application into memory but not display the application if said second user input is not detected.

9. An apparatus according to claim 1, wherein said user inputs are made through an input device.

10. A mobile telephone comprising the apparatus of claim 1.

11. An apparatus according to claim 1 wherein the at least one memory and the computer program code are further configured to, with the at least one processor, cause the apparatus at least to determine whether the second user input is detected within a predetermined time from detection of the first user input, and wherein the at least one memory and the computer program code are configured to, with the at least one processor, cause the apparatus at least to complete the first process in response to the second user input only in an instance in which the second user input is determined to have been detected within the predetermined time.

12. An apparatus according to claim 11 wherein the at least one memory and the computer program code are further configured to, with the at least one processor, cause the apparatus at least to abort the first process in an instance in which the second user input is not received within the predetermined time.

13. An apparatus according to claim 1 wherein the at least one memory and the computer program code are further configured to, with the at least one processor, cause the apparatus at least to remove content stored in memory as a result of beginning the first process.

14. A method comprising:
    detecting a first user input corresponding to a first command;
    beginning a first process corresponding to a second command in response to said first user input;
    detecting a second user input corresponding to the second command; and
    completing said first process in response to said second user input,
    wherein a combination of the first and second user inputs is at least one of a double click, a double tap, a long press or a swipe gesture.

15. A method according to claim 14, wherein the first command is to select a first application.

16. A method according to claim 15, wherein the second command is to launch the first application.

17. A method according to claims 16, wherein said first process comprises launching the first application.

18. A method according to claim 17, wherein the launch is completed if the second user input is detected within a predetermined time from said first user input.

19. A method according to claims 18, wherein completing the comprises loading said first application into memory and displaying the application on a display.

20. A method according to any of claims 19, further comprising:
    stopping launching the first application if said second user input is not detected.

21. A method according to any of claims 19, further comprising:
    loading said application into memory but not displaying the application if said second user input is not detected.

22. A method according to any of claims 21, wherein said user inputs are made through an input device.

23. A method according to claim 14 further comprising determining whether the second user input is detected within a predetermined time from detection of the first user input, and wherein completing the first process in response to the second user input comprises completing the first process in response to the second user input only in an instance in which the second user input is determined to have been detected within the predetermined time.

24. A method according to claim 23 further comprising aborting the first process in an instance in which the second user input is not received within the predetermined time.

25. A method according to claim 14 further comprising removing content stored in memory as a result of beginning the first process.

26. A non-transitory computer program product comprising a computer-readable medium bearing computer program code embodied therein for use with a computer, the computer program code comprising:
    code for detecting a first user input corresponding to a first command;
    code for beginning a first process corresponding to a second command in response to said first user input;
    code for detecting a second user input corresponding to the second command; and
    code for completing said first process in response to said second user input,
    wherein a combination of the first and second user inputs is at least one of a double click, a double tap, a long press or a swipe gesture.

* * * * *